Nov. 10, 1925.  
C. F. SPEIDEL  
SPOOL HOLDER FOR CAMERAS  
Filed May 3, 1924  
1,560,615
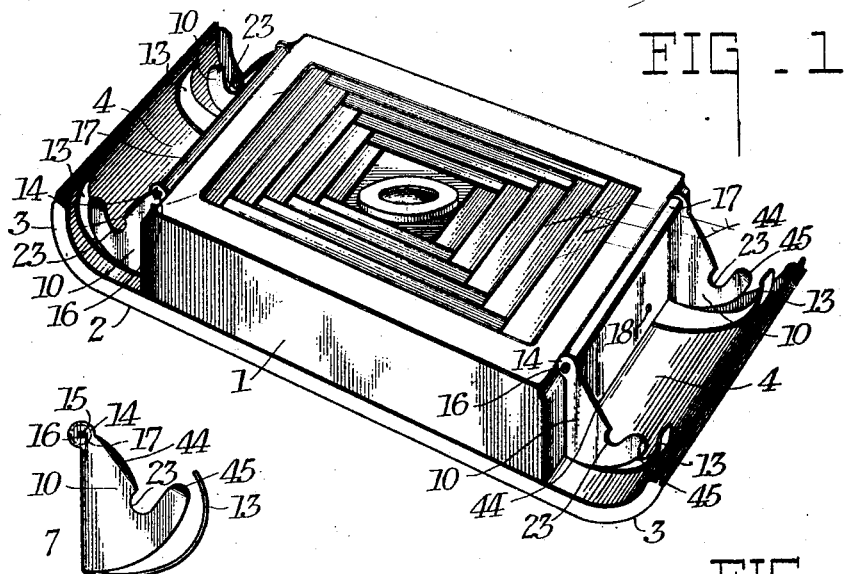
FIG. 1.
FIG. 2.
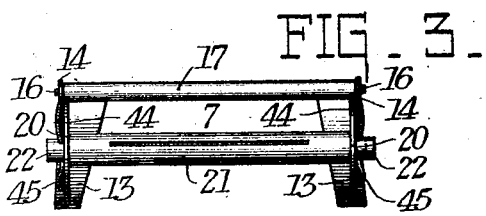
FIG. 3.
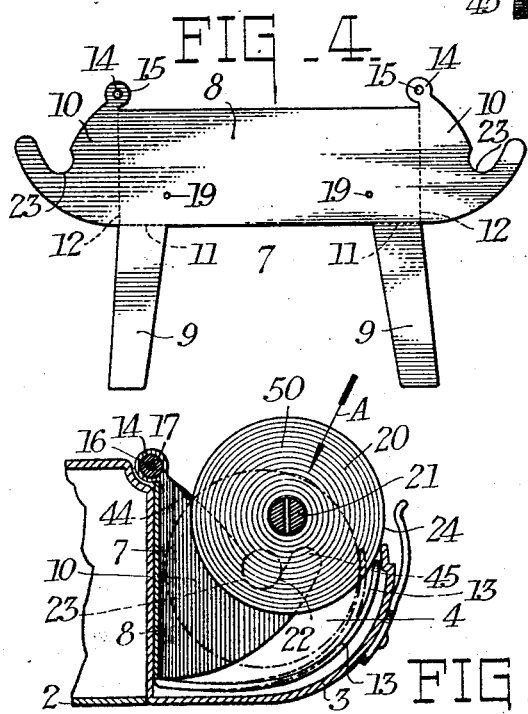
FIG. 4.
FIG. 5.
FIG. 6.
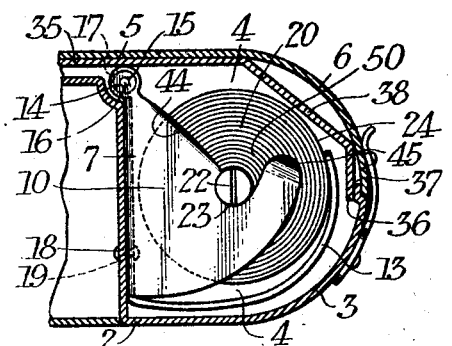
INVENTOR,  
Charles F. Speidel,  
BY R. L. Stinchfield,  
Donald L. Stewart,  
ATTORNEY Patented Nov. 10, 1925.

1,560,615

UNITED STATES PATENT OFFICE.

CHARLES F. SPEIDEL, OF ROCHESTER, NEW YORK, ASSIGNOR TO EASTMAN KODAK COMPANY, OF ROCHESTER, NEW YORK, A CORPORATION OF NEW YORK.

SPOOL HOLDER FOR CAMERAS.

Application filed May 3, 1924. Serial No. 710,860.

*To all whom it may concern:*

Be it known that I, CHARLES F. SPEIDEL, a citizen of the United States of America, residing at Rochester, in the county of Monroe and State of New York, have invented certain new and useful Improvements in Spool Holder for Cameras, of which the following is a full, clear, and exact specification.

This invention relates to photography, and more particularly to photographic cameras. It has for its object to provide a holder to and from which a spool may be moved without manipulating extra parts; to provide a spool holder for retaining a film spool through spring pressure; to provide springs bearing on the spool flanges for this purpose; and to provide a simple, cheap and easily operable holder which can be readily constructed: and other objects will appear hereinafter, the novel features being pointed out in the claims at the end of the specification.

In the drawings wherein like reference characters denote like parts throughout:

Fig. 1 is a perspective view of a camera having spool holders constructed in accordance with and illustrating one form of my invention;

Fig. 2 is an end view of the holder removed from the camera;

Fig. 3 is a plan view thereof;

Fig. 4 is a blank from which the holder may be made;

Fig. 5 is a section showing a spool and spool holder in elevation; and

Fig. 6 is a section showing a spool about to be loaded into the holder.

In Fig. 1 I have shown my holder as applied to a small folding camera in which the camera body 1 is provided with a front wall 2, which curves, at 3, partially around the spool chambers 4. The back 5 carries the sides, rear and end walls, these latter walls 6 partially enclosing the spool chambers 4. Substantially the same type of camera wall construction is shown in U. S. Patent No. 1,376,946, issued May 31, 1921, to Robert Kroedel.

The spool holder designated as a whole as 7 consists of a plate 8 which may be blanked out as shown in Fig. 4, with spaced members 9, and end flanges 10. These members 9 and 10 are bent along the broken lines at 11 and 12; the bending operation for members 9 also curving these members forming them into springs 13. At the top of flanges 10 there are extensions 14 perforated at 15 to receive the shaft 16 which supports the guide roller 17. The holder thus formed may be fastened in the spool chamber 4 by rivets 18 passing through apertures 19.

The film spool here shown includes flanges 20 spaced on a core 21, and having reduced trunnions 22 outside of the flanges. The trunnions fit into the slots 23, which are cut in flanges 10 to form hooks. These hooks properly align the spool, and springs 13, by pressing on the peripheries 24 of flanges 20 retain the spool in winding position. It should be noted that the spring presses the spool through the flanges downwardly into the hooks, and that the slots or notches 23 are arranged at an angle (here about 60 degrees) to the camera body 1. This, as will readily be seen, causes the force exerted upon the spool by film wound to or from the spool, to be transverse to the angle of the slot, and for this reason there is very little chance of the spool pulling from the hooks, even if the springs 13 are comparatively weak.

The camera back 5 is provided with an inside wall 35 having a flange 36 spaced from wall 6, to form a light tight joint at 37. This plate is bent across the curve of wall 6, at 38 in a substantially straight line. The wall is opposite hook 23 and is positioned so that, should springs 13 fail to properly hold the spool in hooks 23, the spool could not be pulled from the hooks because the peripheries 24 of flanges 20 would strike plate 38 and thus be retained.

The operation is simple: a spool grasped naturally by the flanges is thrust in the direction of arrow A in Fig. 6, against the pressure of springs 13 so that the trunnions 22 are engaged by hooks 23. The edges 44 and 45 of flanges 10 are preferably formed outwardly to assist in properly guiding the film spool into position. (Fig. 3). The spool is removed by reversing the operation above described. It will be noted that a large area 50 of flanges 20 is accessible to the operator at all times.

Having thus described my invention, what I claim as new and desire to secure by Letters Patent is:

1. In a photographic roll holder, the combination with spaced spool supporting members including hooks having slots to receive the ends of a film spool, of spring members adapted to press upon the flanges of a spool to hold the ends of the film spool in the hooks.

2. In a photographic roll holder, the combination with a spool support comprising a formed up metal plate, of end portions of the plate bent to form spool supporting members, said members having slots forming hooks adapted to support film spool trunnions, and other portions of the plate being formed into springs adapted to press upon the flanges of a film spool, to retain the spool trunnions in the hooks.

3. In a photographic roll holder, the combination with a spool support comprising a formed up metal plate, of end portions of the plate bent to form spool supporting members, said members having slots forming hooks adapted to support film spool trunnions, other portions of the plate being formed into springs adapted to press upon the flanges of a film spool, to retain the spool trunnions in the hooks, and extensions from the plate adapted to support a film roller over which film may be drawn from the film spool.

4. In a photographic roll holder for cameras, the combination with spaced spool supporting members adapted to revolubly support film spools of the type having trunnions extending beyond the usual flanges, of side flanges having slots disposed at an angle relative to the camera body, spring members adjacent the hooks and being adapted to exert a force transverse to the slots, said spring members being adapted to press upon flanges of a spool supported in the slots by the trunnions.

5. In a photographic roll holder for cameras, the combination with a camera wall forming a part of a spool chamber, a plate attached to the wall, end flanges on the plate having slots therein forming hooks to receive trunnions of a film spool, and a spring adapted to press on the flanges of a film spool to hold the trunnions in the hooks, being adapted to exert a uniform pressure on the flanges throughout the winding operation.

6. In a photographic roll holder for cameras, the combination with a camera wall forming a part of a spool chamber, a plate attached to the wall, end flanges on the plate having slots therein forming hooks to receive trunnions of a film spool, and apertures therein to receive roller trunnions, rollers having trunnions for the film to roll over, and springs adapted to retain the spool trunnions in the hooks by pressing upon flanges of the spool, whereby the film spool may be moved to and from the hooks against the action of the springs, and may be retained in the hooks through the springs pressing upon the spool flanges.

Signed at Rochester, New York, this 30th day of April, 1924.

CHAS. F. SPEIDEL.